(12) United States Patent
Kasik et al.

(10) Patent No.: US 7,347,556 B2
(45) Date of Patent: Mar. 25, 2008

(54) SYSTEMS AND METHODS FOR GENERATING STEREO IMAGES

(75) Inventors: David J. Kasik, Sammamish, WA (US); Gary D. Bernard, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 423 days.

(21) Appl. No.: 11/146,786

(22) Filed: Jun. 7, 2005

(65) Prior Publication Data

US 2006/0274270 A1     Dec. 7, 2006

(51) Int. Cl.
G03B 21/00 (2006.01)
G02B 21/26 (2006.01)
G02B 27/26 (2006.01)
H04N 13/04 (2006.01)
E01D 1/00 (2006.01)

(52) U.S. Cl. ............................. 353/8; 353/13; 353/30; 353/121; 396/465; 348/52; 14/71.5

(58) Field of Classification Search ................ 353/7, 353/8, 10–13, 30, 121; 359/465, 489; 348/55–57, 348/742, 835, 752, 51–53; 349/9; 14/71.5, 14/69.5; 385/16; 352/62
See application file for complete search history.

(56) References Cited

U.S. PATENT DOCUMENTS

| 5,113,285 A | 5/1992 | Franklin et al. |
| 5,258,833 A | 11/1993 | Schenk |
| 5,537,144 A | 7/1996 | Faris |
| 5,552,840 A | 9/1996 | Ishii et al. |
| 5,822,117 A | 10/1998 | Kleinberger et al. |
| 5,825,541 A | 10/1998 | Imai |
| 5,973,831 A | 10/1999 | Kleinberger et al. |
| 6,023,253 A | 2/2000 | Taniguchi et al. |
| 7,137,162 B2* | 11/2006 | Spencer et al. .............. 14/71.5 |
| 7,187,420 B2* | 3/2007 | Yamazaki et al. .......... 348/752 |

(Continued)

FOREIGN PATENT DOCUMENTS

AU     B-73739/91     1/1992

(Continued)

OTHER PUBLICATIONS

"The New Realm of 3D Vision", Dimension Technologies, Inc. (DTI); http://technology.arc.nasa.gov/success/dti.html; 2 pages; 2001-2003.

(Continued)

*Primary Examiner*—Melissa Jan Koval
(74) *Attorney, Agent, or Firm*—Lee & Hayes, PLLC

(57) ABSTRACT

In one embodiment, a system for generating stereo images includes a front display adapted to project a polarized first image along a viewing axis, a back display adapted to project a polarized second image along the viewing axis and through the front display, and a controller coupled to at least the front display and adapted to oscillate image projection between the front display and back display. The system in this embodiment further includes a first lens portion and a second lens portion, the first lens portion being polarized to the same state as the front display and the second lens portion being polarized to the same state as the back display.

19 Claims, 4 Drawing Sheets

U.S. PATENT DOCUMENTS

2005/0168816 A1* 8/2005 Fukaishi et al. ............ 359/465

FOREIGN PATENT DOCUMENTS

| | | |
|---|---|---|
| AU | B-11088/92 | 3/1993 |
| AU | A-15981/92 | 4/1993 |
| AU | B-53965/94 | 4/1994 |
| AU | A-63215/94 | 7/1994 |
| AU | A-64627/94 | 1/1995 |
| AU | A-60784/96 | 10/1996 |
| DE | 29924133 | 2/1999 |
| EP | 1121910 | 8/2001 |
| JP | 2002-271819 | 9/2002 |
| NZ | 0514119 | 9/2001 |
| NZ | 0514500 | 10/2001 |
| NZ | 0515395 | 11/2001 |
| NZ | 0511120 | 4/2002 |
| WO | WO 92/16874 | 10/1992 |
| WO | WO 94/17638 | 8/1994 |
| WO | WO 99/42889 | 8/1999 |
| WO | WO 99/44095 | 9/1999 |
| WO | WO 01/09664 | 2/2001 |
| WO | WO 01/15127 | 3/2001 |
| WO | WO 01/15128 | 3/2001 |
| WO | WO 01/15132 | 3/2001 |
| WO | WO 01/38926 | 5/2001 |
| WO | WO 02/084637 | 10/2002 |
| WO | WO 03/023491 | 3/2003 |
| WO | WO 03/032058 | 4/2003 |
| WO | WO 03/040820 | 5/2003 |
| WO | WO 04/001488 | 12/2003 |
| WO | WO 2004/023825 | 3/2004 |
| WO | WO 2004/036286 | 4/2004 |

OTHER PUBLICATIONS

Power Beat 2001 Directors' Report, Report of the Directors to Shareholders, Power Beat International; 5 pages; Mar. 2002.

Kasik, et al., "Evaluating Graphics Displays for Complex 3D Models", Graphics in Advanced Computer-Aided Program; IEEE; pp. 9; May/Jun. 2002.

* cited by examiner

SYSTEMS AND METHODS FOR GENERATING STEREO IMAGES

FIELD OF THE INVENTION

This invention relates to systems and methods for generating stereo images, and more specifically, to systems and methods for generating stereo images using stacked displays of differing polarizational states.

BACKGROUND OF THE INVENTION

Single Liquid Crystal Display (LCD) screens are used in various monitors to display two-dimensional images. LCD screens typically have a light source, a first polarizing filter, a liquid crystal layer, and a second polarizing filter. Generally, the first polarizing filter polarizes light originating from an unpolarized light source. The second polarizing filter is set to the same polarizational state as the first polarizing filter. Thus, light polarized from the first filter is passed through the second filter without attenuation. However, when an electrical field is applied locally to the liquid crystal layer, the crystals modify the polarization state of the light incoming from the first polarization filter. If the modified polarization state is orthogonal to the first filter, the newly polarized light will be prevented from passing through the second polarization filter. In this manner, portions of a monitor will appear to be on or off to a viewer based on the electrical field applied to the crystal layer. Commonly, the polarizational state for a flat-panel LCD screen is purely linear, and the light viewed by the user of a flat-panel display is linearly polarized.

Single LCD screens are highly useful in presenting information to a viewer. Indeed, they are used in mobile phones, television monitors, computer screens, watches, and many other applications. Although highly useful, single LCD screens are limited in their ability to present three-dimensional images. Typically, shaded surface, hidden line, and perspective rendering methods are used to create the illusion of three-dimensions for such models on a single screen. The illusion of a three-dimensional image can also be achieved by using more than one LCD screen stacked at different distances from a viewer. In this configuration, each screen contains a planar slice of a real three-dimensional model, and the viewer integrates the multiple planar slices into a three-dimensional image. Although desirable results have been achieved generating three-dimensional images using these methods, there is room for improvement

SUMMARY OF THE INVENTION

The present invention relates to systems and methods for generating stereo images, and more specifically, to systems and methods for generating stereo images using polarized display screens, including stacked Liquid Crystal Display screens with differing polarization states.

In one embodiment, a system for generating stereo images includes a first display adapted to project a polarized first image along a viewing axis, a second display operatively positioned relative to the first display and adapted to project a polarized second image along the viewing axis, and a controller coupled to at least the first display and adapted to oscillate image projection between the first display and second display. The system in this embodiment further includes a first lens portion and a second lens portion, the first lens portion being polarized to the same state as the first display and the second lens portion being polarized to the same state as the second display.

BRIEF DESCRIPTION OF THE DRAWINGS

Embodiments of the present invention are described in detail below with reference to the following drawings.

DETAILED DESCRIPTION

The present invention relates to systems and methods for generating stereo images, and more specifically, to systems and methods for generating stereo images using polarized display screens, including stacked Liquid Crystal Display screens with differing polarization states. Specific details of certain embodiments of the invention are set forth in the following description and in FIGS. 1-6 to provide a thorough understanding of such embodiments. The present invention may have additional embodiments, or may be practiced without one or more of the details described for any particular described embodiment.

Figure 1:
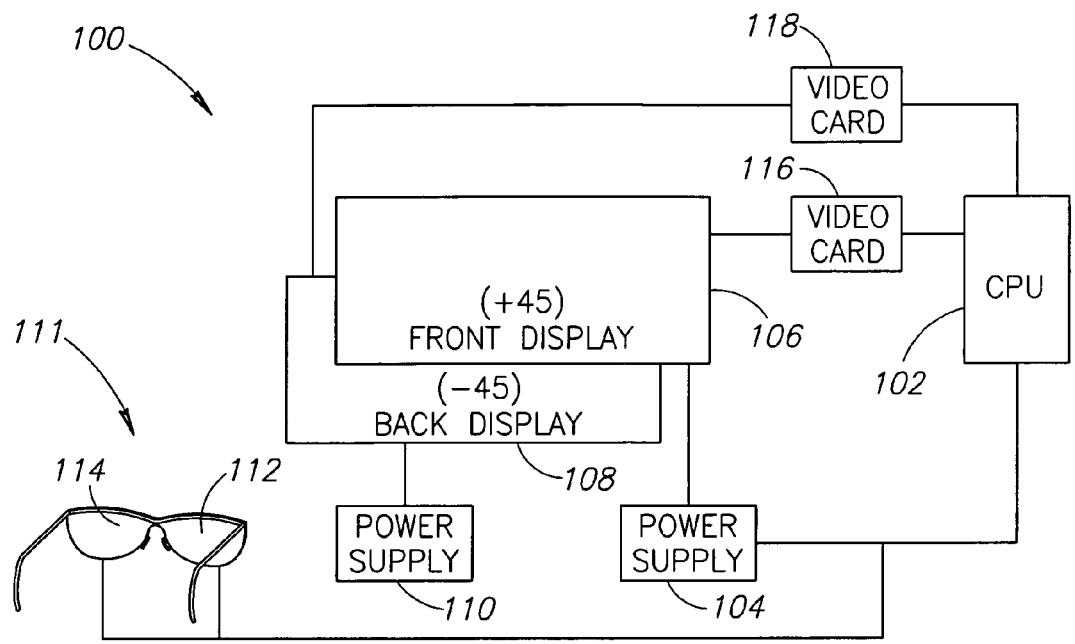
FIG. 1 is front elevation view of a dual LCD screen assembly in accordance with an embodiment of the invention.

FIG. 1 is front elevation view of a dual LCD screen assembly 100 in accordance with an embodiment of the invention. The assembly 100 includes a Central Processing Unit (CPU) 102 operatively coupled to a first video card 118 and a second video card 116. The first video card 118 is operatively coupled to a back display 108 and the second video card 116 is operatively coupled to a front display 106. The CPU 102 is adapted to control a first power supply 104 that is operatively coupled to the front display 106 and a second power supply 110 that is operatively coupled to the back display 108. In an alternative embodiment, the CPU 102 is adapted to control either or both the first power supply 104 and the second power supply 110. A lens assembly 111 includes a first lens portion 114 and a second lens portion 112 which are adapted to receive images projected from the back display 108 and front display 106, respectively. The front and back displays 106, 108 are approximately parallel, and the front display 106 is more proximate to the lens assembly 111 than the back display 108. In an alternative embodiment, the front and back displays 106, 108 are positioned approximately parallel to each other in approximately the same plane.

In one embodiment, the CPU 102 communicates with the first and second video cards 118, 116 to project images on the back and front displays 108, 106. The front display 106 is adapted to project images polarized at a first polarization state (e.g. +45 degrees). Similarly, the back display 108 is adapted to project images at a second polarization state (e.g. −45 degrees). In one particular embodiment, the first polarization state and the second polarization state are orthogonal. In another particular embodiment, the polarization state of the front display 106 is electrically induced, and the back display 108 is adapted to project polarized images uninterrupted with constant power from the second power supply 110. The CPU 102 is adapted to control the first power supply 104 to oscillate the power supplied to the front display 106 (e.g. between the "on" and "off" positions). For example, when the first power supply 104 is in the "on" position the front display 106 projects images that are polarized at the first polarization state (e.g. +45 degrees) and the back display 108 images are unable to project through the front display 106 because of the differing polarization. When the first power supply 104 is in the "off" position, the front display 106 does not project an image and is not polarized. Thus, the back display 108 images are able to project through front display 106 to the lens assembly 111. The net result of oscillating power to the first power supply 104 is to produce a series of alternating images with different polarity at different depths. In one particular embodiment, the first lens portion 114 is adapted as a polarization filter to permit images of the back display 108 to pass and to prevent images of the front display 106 from passing. Similarly, the second lens portion 112 may be adapted as a polarization filter to permit images of the front display 106 to pass and to prevent images of the back display 108 from passing. Therefore, a wearer of the lens assembly 111 will perceive images from the back display 108 in one eye and images from the front display 106 in the opposite eye.

In an alternative embodiment, the first lens portion 114 is adapted to permit images of the front display 106 to pass and the second lens portion 112 is adapted to permit images of the back display 108 to pass. In one particular embodiment, the polarization states of the first lens portion 114 and second lens portion 112 are controllable. When the first lens portion 114 permits polarized light from the back display 108 to pass, the CPU 102 or other controller may alter the polarization state of the first lens portion 114 to permit polarized light from the front display 106 to pass. Similarly, when the second lens portion 112 permits polarized light from the front display 106 to pass, the CPU 102 or other controller may alter the polarization state of the second lens portion 112 to permit polarized light from the back display 108 to pass. Also, when the polarization states of the first lens portion 114 and the second lens portion 112 permit polarized light to pass from the back display 108 and the front display 106, the CPU 102 or other controller may adapt the polarization states of either or both of the lens portions 114, 112 to compensate for head roll arising from the head movement of a wearer of the lens portions 114, 112 with respect to the displays 106, 108.

Figure 6:
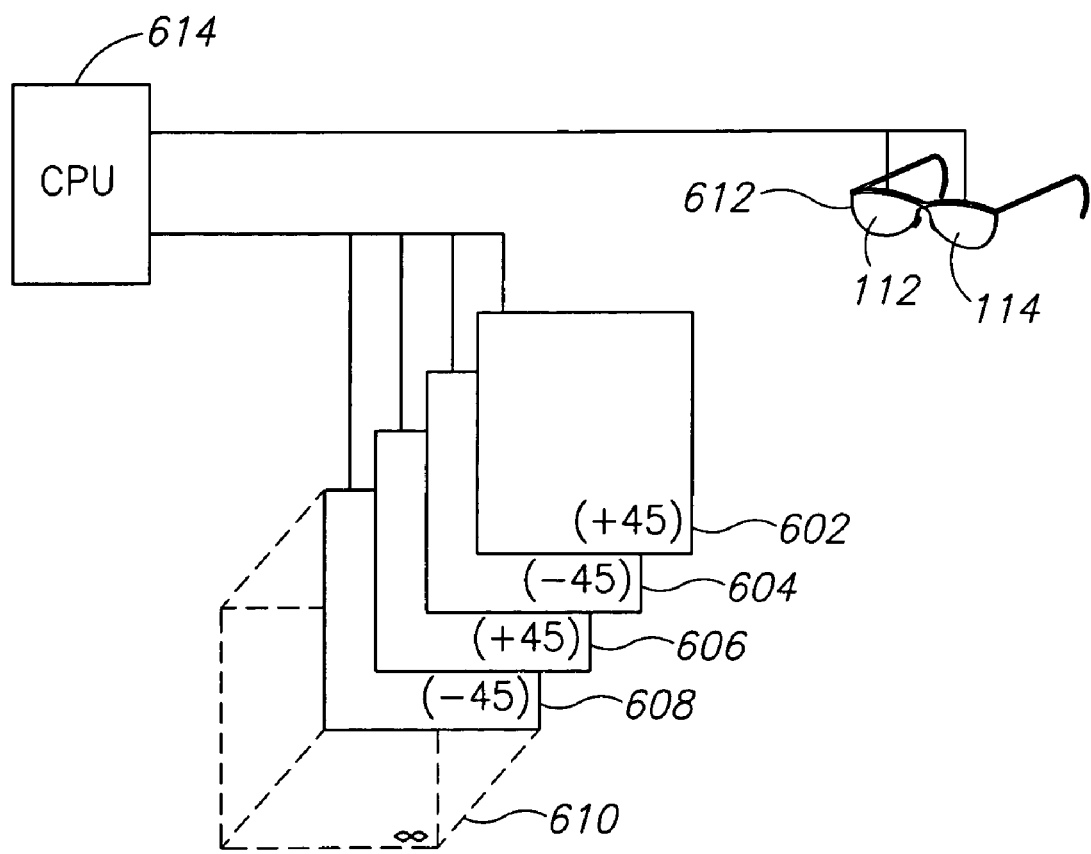
FIG. 6 is a front elevational view of a multiple LCD screen assembly, in accordance with an embodiment of the invention.

It will be appreciated that a variety of alternate embodiments may be conceived, and that the invention is not limited to the embodiments described above with reference to FIG. 1. For example, in another embodiment of the invention, the first and second video cards 118, 116 are combined into a single video card adapted to separately control multiple LCD screens. In a further embodiment, more than two LCD screens are utilized as depicted in FIG. 6. In yet another embodiment, the LCD screens are substituted with any device capable of projecting polarized images. In another embodiment, the CPU 102 is operatively coupled to the second power supply 110. Accordingly, the CPU 102 is adapted to control the first power supply 104 and the second power supply 110 to oscillate the power supplied to the front display 106 and the back display 108 (e.g. between the "on" and "off" positions). In this embodiment, the polarization of the back display 108 may or may not be electrically induced. Alternatively, the first and second power supplies 104, 110 are combined into a single power supply unit capable of separately controlling power to multiple displays. In a further embodiment, the first and second lens portions 114, 112 are separate lenses, or alternatively, the first and second lens portions 114, 112 are part of a single lens structure. In yet a further embodiment, the front and back displays 106, 108 are adapted to polarize light at any desired polarization state including linear, circular, elliptical, or others. In yet another embodiment, the first and second lens portions 114, 112 are adapted to permit polarized light of any polarization state.

Figure 2:
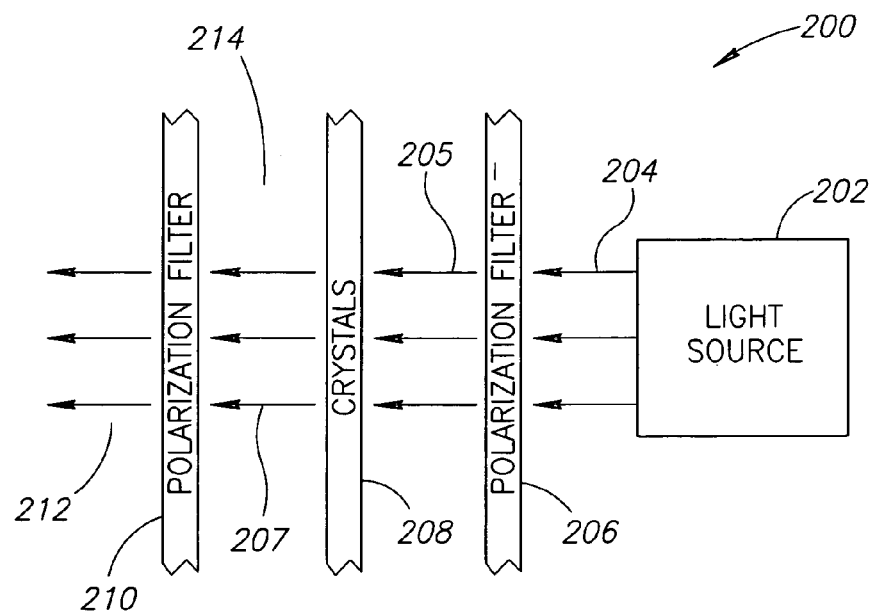
FIG. 2 is a cross-sectional view of a single LCD screen in accordance with an embodiment of the invention.

FIG. 2 is a cross-sectional view of a single LCD screen 200 of the dual LCD screen assembly 100 of FIG. 1 in accordance with an embodiment of the invention. In this embodiment, a light source 202 is adapted to project light 204 through a first polarization filter 206, a substrate 214, a portion that includes crystals 208, and a second polarization filter 210.

In one embodiment, the light 204 is initially unpolarized, and is polarized to a desired polarization state (e.g. +45 degrees) as it passes through the first polarization filter 206. Thus, a first polarized light 205 emerges from the first polarization filter 206 at the desired polarization state (e.g. +45 degrees). The portion that includes crystals 208 does not alter the polarization of the first polarized light 205 in the absence of an electrical field. Thus, a second polarized light 207 emerges from the portion that includes crystals 208 with the same polarization as the first polarized light 205 (e.g. +45 degrees). The second polarization filter 210 is adapted to permit light to pass with the same polarization state as the first polarized light 205 (e.g. +45 degrees). Thus, a third polarized light 212 emerges from the second polarization filter 210 with the same polarization as the first polarized light 205 (e.g. +45 degrees). However, when an electrical field is applied to the portion that includes crystals 208, the second polarized light 207 is polarized to a differing polarization than first polarized light 205 (e.g. other than +45 degrees). The second polarization filter 210 does not permit the second polarized light 207 to pass when the polarization of the second polarized light 207 is different from the first polarized light 205 (e.g. other than +45 degrees). Therefore, when an electrical field is applied to the portion that includes crystals 208, the third polarized light 212 is not present.

In alternate embodiments, a variety of LCD screen assemblies may be conceived. For example, the first and second polarization filters 206, 210 may be adapted to permit light of any polarization state to pass. Also, the first and second polarization filters 206, 210 may be adapted to permit different polarized light to pass, and the portion including crystals 208 may be selectively electrically induced to permit (or prevent) the second polarized light 207 to pass through the second polarization filter 210. In yet another embodiment, the polarization of the first polarization filter 206 and the second polarization filter 210 are electrically induced or altered. Alternatively, any other method of altering the polarization of the filters 206, 210 or the crystals 208 may be utilized. In another embodiment, the portion that includes the crystals 208 may be substituted with another substance, structure, or compound that is capable of altering the polarization of light.

Figure 3:
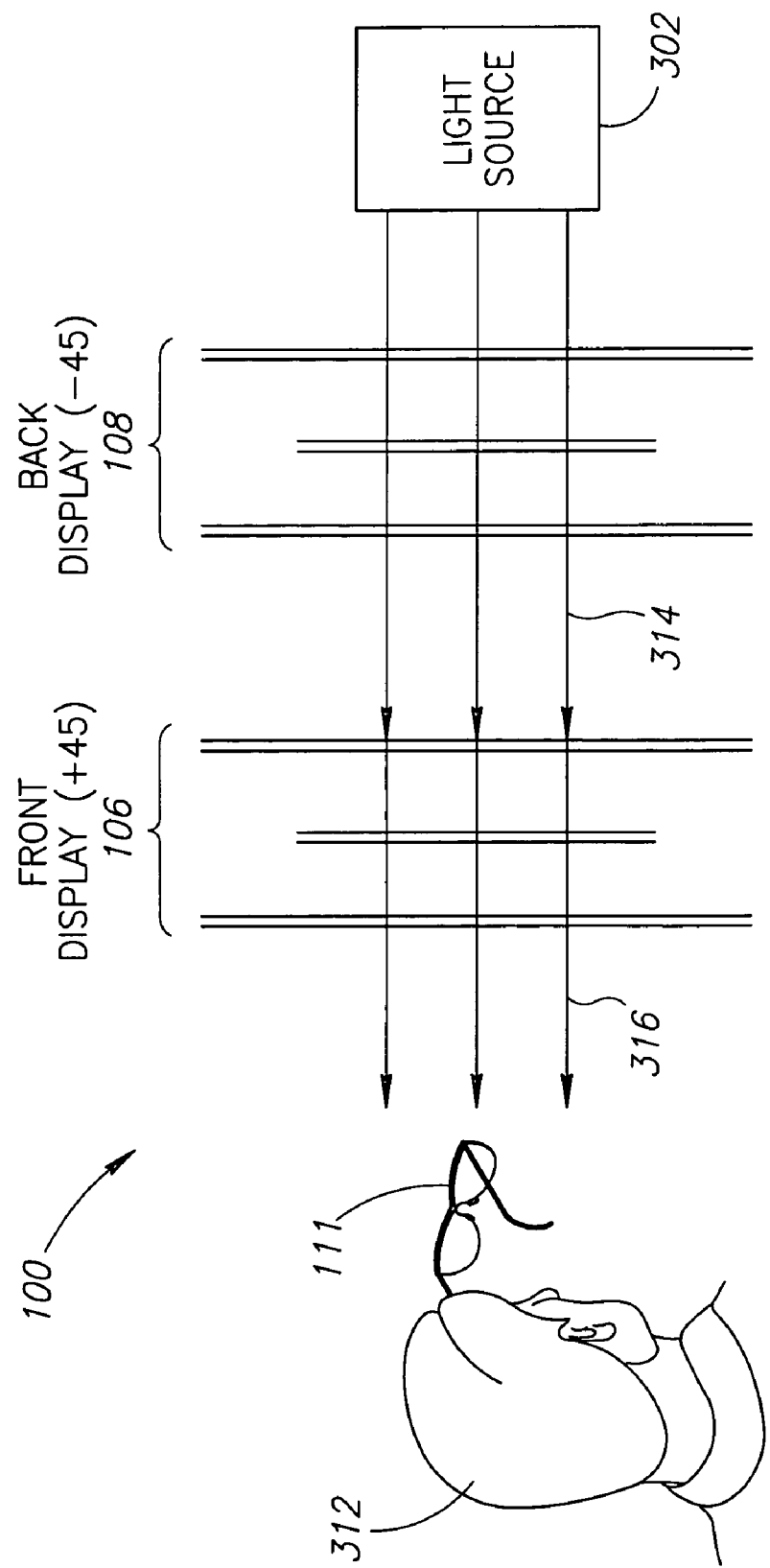
FIG. 3 is a cross-sectional view of the dual LCD screen assembly of FIG. 1 in accordance with an embodiment of the invention.

FIG. 3 is a side cross-sectional view of the dual LCD screen assembly 100 of FIG. 1. In this embodiment, the back display 108 is arranged to be approximately parallel to the front display 106. A light source 302 is positioned to project light. The light enters and emerges from the back display 108 as light 314. Light 314 enters the front display 106 and emerges as light 316. An image viewer 312 is positioned to view light 316 through the lens assembly 111.

In one embodiment, the back display 108 is set to a polarization neutral state. The light source 302 projects unpolarized light that passes unaltered through the back display 108 as light 314. The unpolarized light 314 reaches the front display 106. The front display 106 polarizes the incoming light (e.g. to +45 degrees) as it passes through the front display 106 into light 316. The image viewer 312 views the polarized light 316 through lens assembly 111. In an alternate embodiment, the back display 108 polarizes light as it passes through the back display 108 as light 314. A light diffusing layer is interposed between the front display 106 and the back display 108. The light diffusing layer diffuses the polarized light 314 to non-polarized light before it reaches the front display 106. In an alternate embodiment, a second light source is operatively positioned between the front display 106 and the back display 108 and adapted to project light through the front display 106. In a further embodiment, the front and back displays 106, 108 are non-parallel or approximately parallel in approximately the same plane (e.g not "stacked"). In another embodiment, the system 100 is expanded by adding additional displays that are arranged near, adjacent to, or approximately parallel to the front and back displays 106, 108. In an alternate embodiment, the displays 106, 108 are concave, convex, non-planar, or any other non-uniform shape.

In another embodiment, the back display 108 polarizes light (e.g. to −45 degrees) as it passes as light 314. The front display 106 is set to a non-polarized state and the polarized light 314 passes unaltered through the front display 106 as polarized light 316 and is viewed by image viewer 312 through lens assembly 111.

Figure 4:
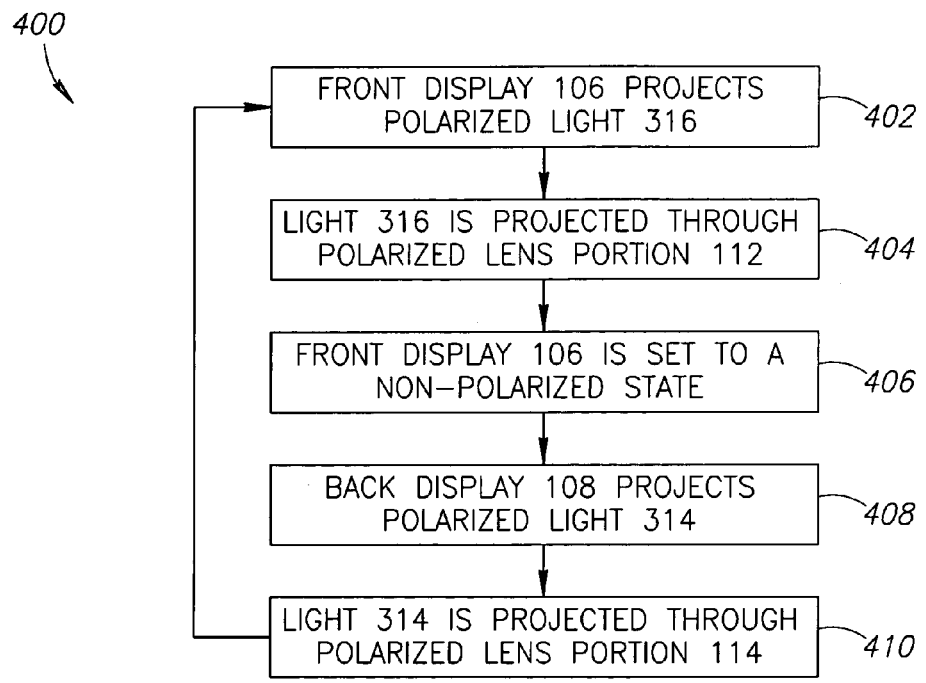
FIG. 4 is a flow diagram of a method for generating stereo images in accordance with a further embodiment of the invention.

FIG. 4 is a flow diagram of a method 400 for generating stereo images, in accordance with an embodiment of the invention. In this embodiment, the front display 106 projects a first polarized light 316 (e.g. +45 degrees) at a block 402. The first polarized light 316 is then projected through a first polarized lens portion 112 and prevented from passing through a second polarized lens portion 114 at a block 404. At a block 406, the front display 106 is set to the isotropic (or non-polarizing) position. The back display 108 then projects a second polarized light 314 (e.g. −45 degrees) at a block 408. The second polarized light 314 passes unaltered through the front display 106 as polarized light 316 and is then projected through the second polarized lens portion 114 and prevented from passing through the first polarized lens portion 112 at a block 410. The method 400 may then return to block 402. The method 400 may continue indefinitely or may be terminated at any desired time.

Figure 5:
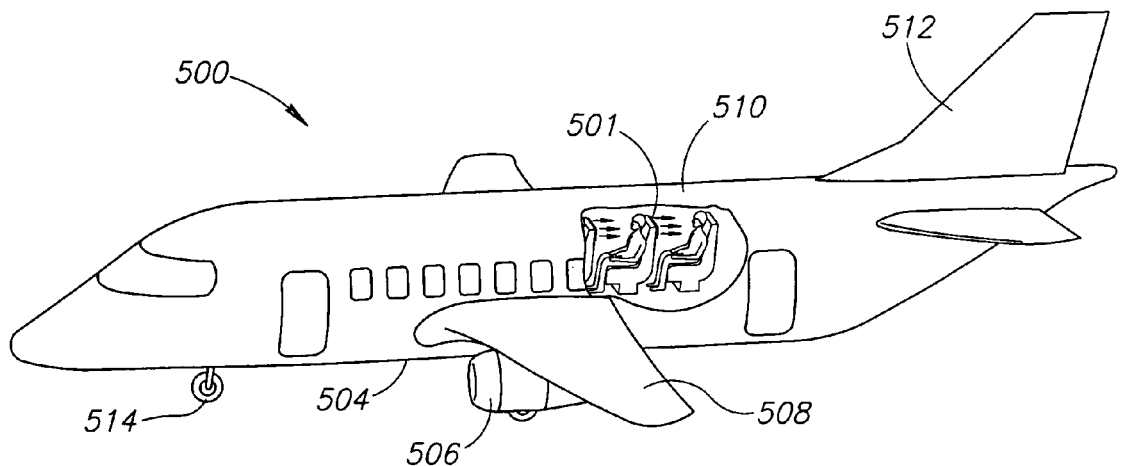
FIG. 5 is an elevational view of an aircraft in accordance with yet another embodiment of the invention.

Embodiments of the present invention may be used in a wide variety of applications, including aircraft, ships, vehicles, video games, arcade games, television, personal assistants (PDAs), handheld devices, cell phones, and personal computers. For example, FIG. 5 is an elevational view of an aircraft 500 in accordance with yet another embodiment of the invention. The aircraft 504 generally includes a variety of components and subsystems generally known in the pertinent art, and which, in the interest of brevity, will not be described in detail. For example, the aircraft 504 generally includes one or more propulsion units 506 that are coupled to wing assemblies 508, or alternately, may be coupled to a fuselage 510 or even other portions of the aircraft 504. Additionally, the aircraft 504 includes a tail assembly 512 and a landing assembly 514 coupled to the fuselage 510, and a flight control system 502, as well as a plurality of other electrical and mechanical systems and subsystems that cooperatively perform a variety of tasks necessary for the operation of the aircraft 504. The aircraft 504 may also include one or more embodiments of the screen assemblies in accordance with the present invention located in various portions of the aircraft 504 including, for example, a cabin screen assembly 501 for use by the passengers (e.g. terrain viewing), or an instruction screen within the cabin used by crew members of the aircraft 504. Alternately, it may even be possible to include a cockpit screen assembly in accordance with the invention for use on the flight deck of the aircraft 504.

The aircraft 504 shown in FIG. 5 is generally representative of a commercial passenger aircraft, including, for example, the 737, 747, 757, 767 and 777 commercial passenger aircraft available from The Boeing Company of Chicago, Ill. In alternate embodiments, however, embodiments of the invention may be incorporated into flight vehicles of other types. Examples of such flight vehicles include other commercial aircraft, manned or unmanned military aircraft, rotary wing aircraft, or types of flight vehicles, as illustrated more fully in various descriptive volumes, such as Jane's All The World's Aircraft, available from Jane's Information Group, Ltd. of Coulsdon, Surrey, UK.

FIG. 6 is a front elevational view of a multiple LCD screen assembly, in accordance with an embodiment of the invention. In one embodiment, CPU 614 is operatively coupled to the screens 602, 604, 606, and 608. In an alternate embodiment, the CPU 614 is coupled to additional screens up to infinity 610. The screens 602, 604, 606, and 608 are stacked adjacent and approximately parallel to one another whereby screen 602 is more proximate to lens assembly 612 and screen 608 is more distant to lens assembly 612. Screens 602 and 606 have nearly the same polarization states (e.g. +45 degrees). Screens 604 and 608 have nearly the same polarization states that are different from the polarization states of screens 602 and 606 (e.g. −45 degrees). However, the screens may be set to any other desired polarization states. In an alternative embodiment, the polarization states are orthogonal to one another. Lens assembly 612 is operatively positioned to view images projected from the screens 602, 604, 606, and 608.

In another embodiment, the CPU 614 controls screens 602, 604, 606, and 608 to project images from screens 602 and 606. Accordingly, lens assembly 612 receives images from screens 602 and 606 polarized to the same state as that of the screens 602 and 606 (e.g. +45 degrees). The CPU 614 then controls screens 602, 604, 606, and 608 to project images from screens 604 and 608. Accordingly, lens assembly 612 receives images from screens 604 and 608 polarized to the same state as that of the screens 604 and 608. Lens assembly 612 is arranged to pass light polarized at the same state as screens 602 and 606 in the first lens portion 114 and light polarized at the same state as screens 604 and 608 in the second lens portion 112. In this embodiment, a person wearing lens assembly 612 perceives images projected from screens 602 and 606 in one eye and images projected from screens 604 and 608 in another eye. Alternatively, CPU 614 controls the screens 602, 604, 606, and 608 to be polarized at any state and to project images from any combination of the screens 602, 604, 606, or 608.

In yet another embodiment, the polarization states of the first lens portion 114 and second lens portion 112 are controllable. The CPU 614 or other controller may alter the polarization state of the first lens portion 114 to permit polarized light from any of screens 602, 604, 606, or 608 to pass. Similarly, the CPU 614 or other controller may alter the polarization state of the second lens portion 112 to permit polarized light from any of screens 602, 604, 606, or 608 to pass. Also, the CPU 614 or other controller may adapt the polarization states of either or both of the lens portions 114, 112 to compensate for head roll arising from the head movement of a wearer of the lens assembly 612 with respect to the screens 602, 604, 606, 608.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A system for generating stereo images, comprising:
    a front display adapted to project a polarized first image along a viewing axis;
    a back display adapted to project a polarized second image along the viewing axis, the back display positioned to project the polarized second image through the front display; and
    a controller coupled to at least the front display and adapted to oscillate image projection between the front display and back display.

2. The system of claim 1 wherein the system further comprises a first lens portion and a second lens portion, the first lens portion being polarized to the same state as the front display and the second lens portion being polarized to the same state as the back display.

3. The system of claim 2, wherein the polarized first image and polarized second image are orthogonally polarized.

4. The system of claim 3 wherein the front display is polarization neutral when the back display is projecting an image.

5. The system of claim 4 wherein the controller is further coupled to the back display and adapted to oscillate image projection between the front display and the back display.

6. A method of generating stereo images comprising the steps of:
    positioning at least a front and a back display screen;
    projecting a first polarized image from the front display screen;
    viewing the first polarized image through a first polarized lens portion;
    projecting a second polarized image from the back display screen, the second polarized image projected through the front display screen; and
    viewing the second polarized image through a second polarized lens portion.

7. The method of claim 6 wherein projecting a first polarized image and a second polarized image includes polarizing the front and back display screens to different polarization states.

8. The method of claim 7 wherein viewing the first polarized image includes dynamically setting the first polarized lens portion to the same polarization state as the front display screen and setting the second polarized lens portion to the same polarization state as the back display screen.

9. The method of claim 8 wherein the polarization difference between the front and back display screens is orthogonal.

10. The method of claim 9 wherein positioning at least a front and back display screen includes positioning the front display screen more proximate than the back display screen to the first and second polarized lens portions, the front display screen at least partially overlapping the back display screen.

11. The method of claim 10 wherein projecting a second polarized image includes removing the polarization state from the front display screen.

12. An aircraft, comprising:
    a fuselage;
    a lift-generating surface coupled to the fuselage;
    a propulsion system operatively coupled to at least one of the fuselage and the lift generating surface; and
    a system for generating stereo images disposed within the fuselage and including:
        a front display adapted to project a polarized first image along a viewing axis;
        a back display adapted to project a polarized second image along the viewing axis, the back display positioned to project the polarized second image through the front display; and
        a controller coupled to at least the front display and adapted to oscillate image projection between the front display and back display.

13. The system for generating stereo images of claim 12 wherein the system further comprises a first lens portion and a second lens portion, the first lens portion being polarized to the same state as the front display and the second lens portion being polarized to the same state as the back display.

14. The system for generating stereo images of claim 13 wherein the polarized first image and polarized second image are polarized orthogonally.

15. The system for generating stereo images of claim 14 wherein the front display is polarization neutral when the back display is projecting an image.

16. The system for generating stereo images of claim 15 wherein the controller is further coupled to the back display and adapted to oscillate image projection between the front display and the back display.

17. A system for generating stereo images, comprising:
    a front display adapted to project a polarized first image along a viewing axis; a back display operatively positioned relative to the first display and adapted to project a polarized second image along the viewing axis;
    at least one middle display operatively positioned relative to the front display and the back display and adapted to project at least a third polarized image along the viewing axis, the at least one middle display positioned so as to project the at least third polarized image through the front display; and
    a controller coupled to at least one of the front display, the back display and the at least one middle display and adapted to oscillate image projection between the front display, the back display, and the at least one middle display.

18. The system of claim 17 wherein the system further comprises a first lens portion and a second lens portion, the first lens portion being polarized to the same state as at least one of the front display, the back display, and the at least one middle display and the second lens portion being polarized to the same state as at least one of the front display, the back display, and the at least one middle display.

19. The system of claim 18, wherein the polarized first image, the polarized second image, and the at least a third polarized image are orthogonally polarized.

* * * * *